Feb. 20, 1934.　　　C. M. GERHOLD　　　1,948,348
EXHAUST GAS WASHING APPARATUS
Filed Jan. 10, 1931　　　2 Sheets-Sheet 1
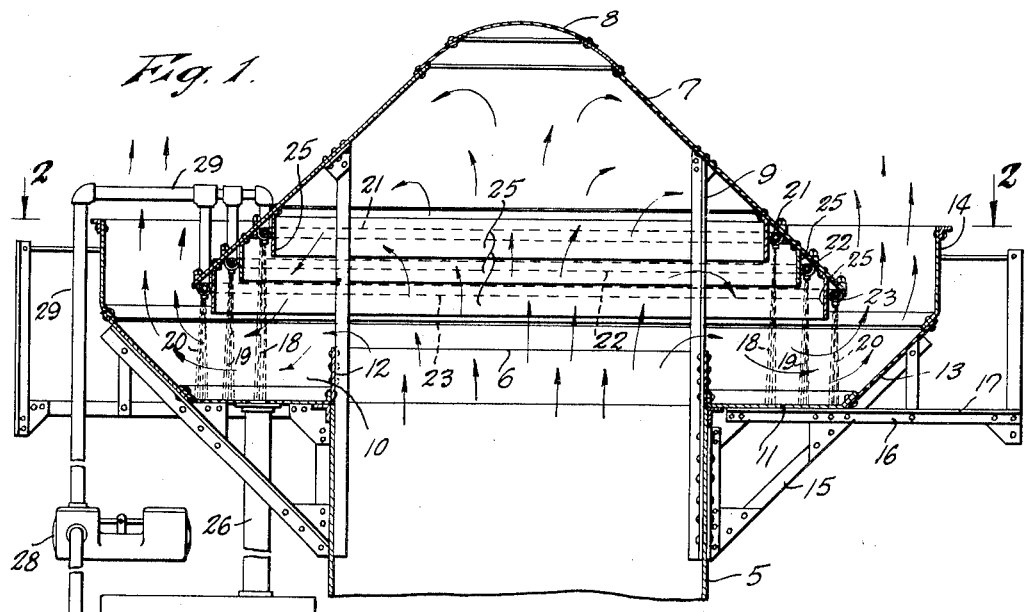
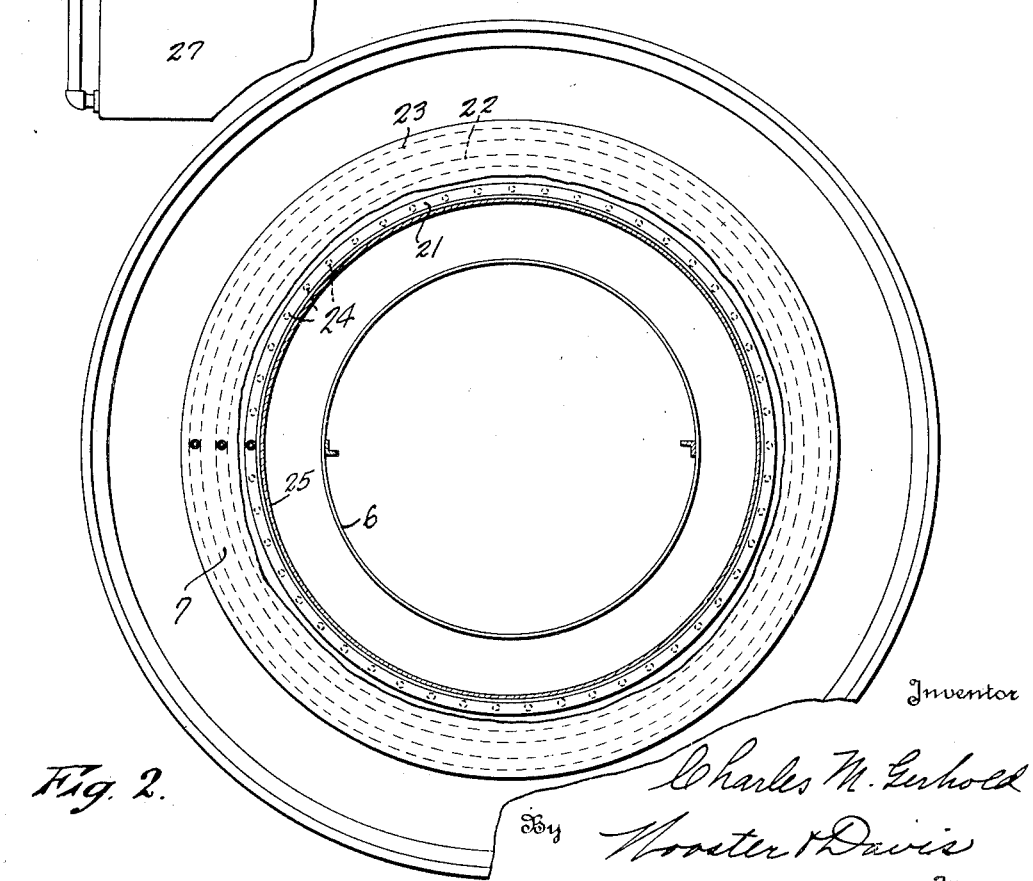

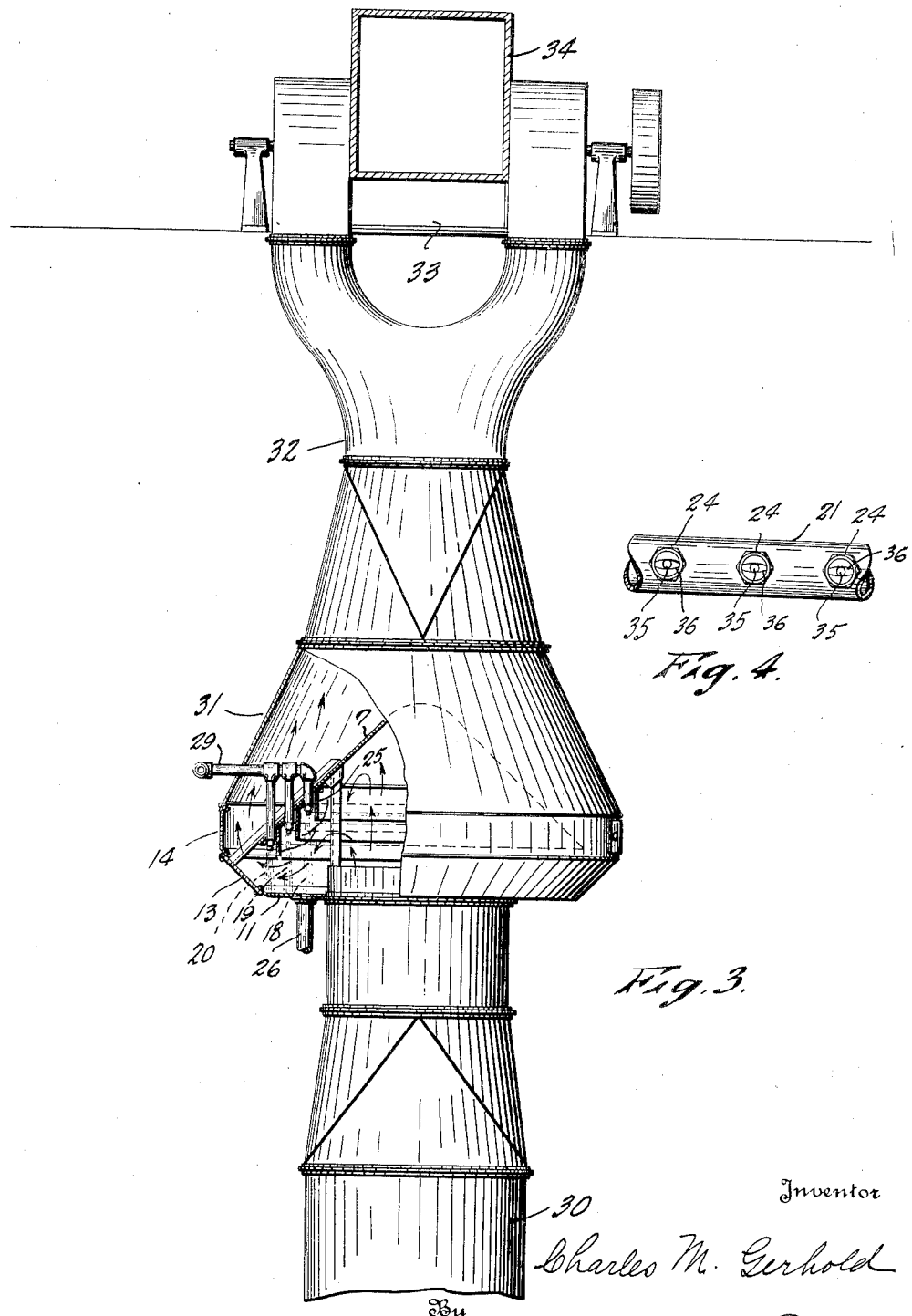

Patented Feb. 20, 1934

1,948,348

UNITED STATES PATENT OFFICE 1,948,348

EXHAUST GAS WASHING APPARATUS

Charles M. Gerhold, New York, N. Y.

Application January 10, 1931. Serial No. 507,801

3 Claims. (Cl. 261—126)

This invention relates to an improved process and apparatus for washing gases to remove soot, ashes, dirt and other solid particles from the gases and also to remove objectionable fumes such as acid fumes and objectionable odors. An example of gases to be washed are exhaust gases from furnaces, dust laden air and gases from metallurgical plants such as melting furnaces for metal casting plants, and similar like gases. It has for an object to provide an improved process and apparatus which is simple in operation and construction and will remove practically all solids and objectionable gases and fumes from the exhaust or other gases.

It is also an object of the invention to provide an improved construction which may be applied to a stack at the upper end thereof to wash the gases before they are discharged into the atmosphere, or which may be used at any point between the boilers and the discharge from the stack, such for example as between the economizer and induced draft fans to remove the solid particles and objectionable fumes before the gases pass into the fans to thus protect the fans from action of acid fumes or the action of solid particles and the like.

A further object of the invention is to provide a process and apparatus for washing gases which will not interfere with or reduce the draft, but on the other hand will increase the draft as well as wash the gases.

With the foregoing and other objects in view the invention consists in a certain process and apparatus for carrying out this process, the preferred form of which is shown in the accompanying drawings forming a part of this specification it, however, being understood that various modifications may be used without departing from the principles of the invention.

In these drawings:

Fig. 1 is a vertical section through a preferred form of my improved device as applied to the top of a stack or other flue leading to the atmosphere.

Fig. 2 is a transverse section substantially on line 2—2 of Fig. 1.

Fig. 3 is a side elevation and partial section showing how the device may be used in a gas conducting conduit or flue such for instance as between an economizer and an induced draft fan; and Fig. 4 is a view looking upwardly toward the nozzles showing somewhat diagrammatically the location of the nozzles for throwing a flat or fan like spray to provide a continuous curtain of a liquid spray.

The improved process comprises broadly the passing of the gases to be washed through one or more continuous curtains of a liquid spray so that all the gases are required to pass through this spray. Preferably two or three of these curtains are used so that the gases pass through them in succession, but the number of these spray curtains may be varied as found desirable, and the sprays are so arranged and the gases are fed to them in such a manner that the movement of the liquid of the spray tends to draw the gases through and thus increase the draft instead of decreasing it.

In referring first to Figs. 1 and 2, an apparatus is shown in these figures applied to the top or discharge end of a flue or stack where the gases are ordinarily discharged into the atmosphere. The top portion of the stack is indicated at 5 and may be any of the usual constructions such as the sheet metal stack as shown or it can be, of course, applied to concrete or brick stacks, or any stack construction. Spaced above the end 6 of the stack is a deflector dome or hood 7 preferably substantially conical in shape with a rounded apex 8, this hood being spaced above the top of the stack a sufficient distance to provide a sufficient passageway for the gases downwardly and outwardly over the top of the stack and under the lower edge of the hood as indicated by the arrows on the drawings. This hood may be supported by any suitable means such as the upright angle members 9 secured to the stack and the inner wall of the hood.

Below the lower, outer edge of the hood is provided a trough or spray chamber 10 through which the gases pass to the atmosphere. This may be formed of any suitable construction, but as shown comprises a sheet metal pan or bottom member 11 secured to the outer side of the stack and has an inner upright wall 12 secured thereto. The outer wall of the trough is formed by inclined sheet metal wall 13 and at the outer edge of this inclined wall is the upright wall 14 so that as gases pass out they flow upwardly. This structure is supported by any suitable means such as the structural steel framework 15 and 16 secured to the stack. Outwardly of the side walls 14 may be provided a suitable catwalk 17 to permit a workman to gain easy access to the device for cleaning and repair.

On the under and inner wall of the hood 7 and over the trough 10 are mounted means for producing continuous curtains of liquid spray. In the present instance there is shown three of these curtains of continuous spray indicated at 18, 19 and 20, but the number may be varied as found desirable. In practice, I have found three to be very effective. These sprays may be conveniently formed by circular pipes 21, 22 and 23 mounted in any suitable manner on the under wall of the hood and each having a plurality of nozzles 24 giving a flat spray of liquid. The nozzles may be of any suitable form to give this flat spray, but are preferably of the type indicated somewhat diagrammatically in Fig. 4. Thus each nozzle may have a passage or aperture 35 merging into elongated vents or grooves 36 in the face of the nipple which produces a flat or fan like spray. The nipples are so arranged that the elongated vent lies longitudinally of the pipe and thus are in alignment with each other and, therefore, these flat or fan like sprays form a continuous curtain of the liquid spray for the entire periphery or length of the circular or closed pipe loops 21, 22 and 23. These nozzles are so spaced in position that the plane of the spray is in substantially the peripheral plane of the pipes and are so spaced that they make a continuous curtain of a liquid spray, and to insure that the gases must pass through the continuous curtain deflecting plates 25 are provided in front of each set of nozzles extending from the wall of the hood above the nozzles to a point sufficiently below the nozzles to extend to at least a point at or below the location where the adjacent sprays contact. Thus, below these baffles there is a continuous curtain of the liquid spray so that all the gases must pass through the spray and be treated and there is no chance of part of the gases passing through openings in the curtains closely adjacent the nozzles. It is preferred that the sprays be directed downwardly as shown as this makes it somewhat more convenient and effective in forming the continuous curtain and it is also easier with this arrangement to prevent the spray being blown out by a heavy wind.

It will be noted from the drawings as indicated by the arrows that the gases pass upwardly from the stack and are deflected downwardly and outwardly by the hood 7. It will thus be evident that as the gases pass into the first curtain 18 of the liquid spray they are moving in substantially the same direction as that in which the liquid of the spray is moving and, therefore, the action of this spray is to draw the gases downwardly and outwardly and force them through the outer curtain, the flow of the gases through the outer curtain 20 being laterally through it and substantially at right angles to direction of flow of the liquid. Thus, it will be evident that in this device, although the gases must pass through the continuous curtains of liquid spray, this spray does not decrease the draft, but on the other hand increases it so as to produce a better draft for the gases as well as washing them. Also, as the water is at a lower temperature than that of the gas it cools the gases tending to further increase the draft. As the gases pass through this liquid spray, the solid particles such as soot, dirt, ashes and the like are carried down with the liquid into the pan 11 and are carried off through the drain pipe 26. This liquid spray also absorbs acid fumes such as sulphuric acid fumes and the like which is carried off with the liquid. Thus, the gases are not only cleaned of solid particles, but are also purified of objectionable fumes and odors so that the gases as discharged into the atmosphere are harmless and do not deposit soot and dirt on surrounding objects or cause objectionable odors and injury from acid fumes.

The water carried off through the drain pipe 26 may be discharged into a sewer or other suitable location or may be led to a screen tank 27 where the solids may be screened out of the water and it can again be pumped back into the spray nozzles by means of a suitable pump 28 through a discharge pipe 29, or if preferred fresh water from any suitable supply can be fed to the nozzles. If desired, neutralizing chemicals can be added to the water to neutralize the acids or other fumes. Any suitable material may be used for the elements of the device, but to increase the life of the apparatus metals should be used which are resistant to the action of the gases and the weak acids formed by the dissolving of the acid fumes in the water. It is also to be noted that the outer curtain or spray 20 is located so that it passes through the gases as they take a sharp turn or change in direction under the edge of the hood. Thus, there are at this point two effects tending to throw down or separate out the solid elements, the centrifugal action caused by the sharp change in direction of flow assisted by gravity and the action of the liquid spray. This device is an improvement on that disclosed in my prior Patent No. 1,757,522 issued May 6, 1930, for Smoke washing apparatus.

Figs. 1 and 2 show the device as applied to the outlet or discharge end of a stack or similar flue, and although the process and apparatus have been more particularly described in connection with furnace gases, it will of course, be evident they are equally applicable for washing any gases such as dust laden air and the like.

The process and apparatus, however, are not limited to use on the discharge end of a stack or flue, but are equally adapted for use within a flue. Such use is indicated in Fig. 3. Here the device is shown as located between the outlet from a series of boilers and an induced draft fan. In the particular instance shown, conduit 30 indicates the outlet from an economizer for heating feed water for the boilers and through which the gases from the boiler pass, and this outlet leads to the space below the hood 7 as in the form shown in Figs. 1 and 2. The construction and arrangement of the washer is the same as that shown in Fig. 1, but instead of discharging into the atmosphere after passing downwardly and outwardly under the edge of the hood through the continuous curtains of liquid spray, the gases are collected by the tapered conduit 31 and are conducted through the pipe 32 to the intakes of one or more induced draft fans 33 from which they are discharged through a suitable conduit 34 into a stack, not shown. It will be evident from this arrangement that the solid particles and acid fumes are removed from the gases before they pass into the fan thus protecting the fan from the action of these solid particles and fumes and greatly increasing the life of the fan. This is a very important feature. At the present time, these fans are quickly eaten by action of the gases and solids and must be renewed at frequent intervals and it has been found that this device greatly increases the life of the fan. The flow of the liquid spray not only tends to draw the gases outwardly, but also being of considerably lower temperature than the gases this spray cools the gases and thus tends to reduce the pressure of the gases at that point. This tends to increase the draft as well as the movement of the spray. Some of the heat from the gases may be transferred through the hood to the gases as they pass over the top of the hood, but this is only a small proportion of the heat of the gases, and furthermore, as the gases are cooled before they enter the induced draft fan the efficiency of the fans is increased and they have a greater capacity with the same speed of operation.

Having thus set forth the nature of my invention, what I claim is:

1. In a device for washing gases, an upwardly extending conduit for the gases, a hood over and spaced above the discharge end of the conduit and larger than the conduit to deflect the gases downwardly and outwardly over the end of the conduit, a trough embracing the end of the conduit and the edge of the hood forming a passage through which the gases pass outwardly under the edge of the hood and then upwardly, and means for projecting a plurality of laterally spaced curtains of liquid spray downwardly through the gases into said trough, the first being adjacent the conduit and another adjacent the edge of the hood to discharge into the gases as they flow outwardly under the edge thereof.

2. In a device for washing gases, an upwardly extending conduit for the gases, a hood over and spaced above the discharge end of the conduit to deflect the gases downwardly and outwardly over the end of the conduit, a trough embracing the end of the conduit and the edge of the hood forming a passage through which the gases pass outwardly under the edge of the hood and then upwardly, a plurality of laterally spaced conduits mounted at the under side of the hood and each having a plurality of nozzles discharging downwardly into the trough, an upright baffle extending downwardly from the hood and located closely adjacent and at the inner side of each set of nozzles to deflect the gases downwardly into the spray from the nozzles, and means for supplying liquid under pressure to said conduits.

3. In a device for washing gases, an upwardly extending conduit for the gases, a hood over and spaced above the discharge end of the conduit to deflect the gases downwardly and outwardly over the end of the conduit, a trough embracing the end of the conduit and the edge of the hood forming a passage through which the gases pass outwardly under the edge of the hood and then upwardly, a set of nozzles surrounding the conduit arranged to project a liquid spray curtain downwardly into the gases while they are moving downwardly, and a second series of nozzles about the periphery of the hood spaced outwardly from the first set of nozzles and located adjacent the lower edge of the hood to project a second liquid spray curtain downwardly into the gases as they pass outwardly under the edge of the hood.

CHARLES M. GERHOLD.